US011255448B2

(12) United States Patent
Komatsuzaki et al.

(10) Patent No.: US 11,255,448 B2
(45) Date of Patent: Feb. 22, 2022

(54) VALVE DISPLACEMENT AND REGULATING MECHANISM

(71) Applicant: SMC CORPORATION, Chiyoda-ku (JP)

(72) Inventors: Hisashi Komatsuzaki, Moriya (JP); Hisataka Kato, Joso (JP); Motohiro Soutome, Ayase (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/273,213

(22) Filed: Feb. 12, 2019

(65) Prior Publication Data

US 2019/0249784 A1    Aug. 15, 2019

(30) Foreign Application Priority Data

Feb. 14, 2018   (JP) .............................. JP2018-024294

(51) Int. Cl.
*F16K 7/17*         (2006.01)
*F16K 37/00*        (2006.01)
(Continued)

(52) U.S. Cl.
CPC ............ *F16K 7/17* (2013.01); *F16K 15/1826* (2021.08); *F16K 31/385* (2013.01);
(Continued)

(58) Field of Classification Search
CPC ........ F16K 31/385; F16K 7/17; F16K 15/186; F16K 15/185; F16K 7/12; G05D 7/012; G05D 16/2095

See application file for complete search history.

(56) References Cited

U.S. PATENT DOCUMENTS

| 2,235,304 A * | 3/1941 | Toussaint .............. F16K 31/365 |
| | | 251/45 |
| 2,877,978 A * | 3/1959 | Ka ........................ F16K 31/385 |
| | | 251/46 |

(Continued)

FOREIGN PATENT DOCUMENTS

| CN | 10428468 A | 6/2015 |
| JP | 3095983 | 10/2000 |

(Continued)

OTHER PUBLICATIONS

Office Action dated Oct. 6, 2020 in Japanese Patent Application No. 2018-024294 (with Unedited Computer-Generated English translation); 8 pgs.

(Continued)

*Primary Examiner* — Matthew W Jellett
*Assistant Examiner* — Christopher D Ballman
(74) *Attorney, Agent, or Firm* — Oblon, McClelland, Maier & Neustadt, L.L.P.

(57) ABSTRACT

A valve is equipped with a displacement amount regulating mechanism (for example, flow rate control device). An abutment member of the displacement amount regulating mechanism protrudes inside a pilot chamber and faces an upper end surface of a valve main body portion of a valve element. When the valve element (the valve main body portion) is separated from a valve seat to bring the valve into an open state, the abutment member is brought into abutment on the upper end surface of the valve main body portion. This abutment regulates the displacement of the valve element.

5 Claims, 4 Drawing Sheets

(51) Int. Cl.
*F16K 31/385* (2006.01)
*F16K 15/18* (2006.01)
*G05D 7/01* (2006.01)
*G05D 16/20* (2006.01)
*F16K 7/12* (2006.01)

(52) U.S. Cl.
CPC ............ *F16K 37/0008* (2013.01); *F16K 7/12* (2013.01); *G05D 7/012* (2013.01); *G05D 16/2095* (2019.01)

(56) References Cited

U.S. PATENT DOCUMENTS

| | | | | |
|---|---|---|---|---|
| 3,189,041 | A * | 6/1965 | Hansen | F25B 41/043 137/489.5 |
| 4,135,696 | A * | 1/1979 | Saarem | F16K 31/402 251/30.02 |
| 4,175,590 | A * | 11/1979 | Grandclement | B29C 66/12822 137/883 |
| 4,535,805 | A * | 8/1985 | Mertz | F16K 31/402 137/489 |
| 4,971,106 | A * | 11/1990 | Tsutsui | H02N 2/023 137/606 |
| 5,335,688 | A * | 8/1994 | Caviar | A01G 25/16 251/26 |
| 6,079,437 | A * | 6/2000 | Beutler | F16K 31/385 137/181 |
| 6,290,203 | B1 * | 9/2001 | Kolze | F16K 31/402 251/30.02 |
| 6,619,612 | B2 * | 9/2003 | Freisinger | G05D 16/2095 251/30.03 |
| 7,234,483 | B2 * | 6/2007 | Kainuma | G05D 16/0672 137/85 |
| 7,255,126 | B2 * | 8/2007 | Arlinghaus, Jr. | G05D 16/0655 137/495 |
| 7,318,447 | B2 * | 1/2008 | Law | G05D 16/163 137/487.5 |
| 8,083,205 | B2 * | 12/2011 | Sneh | F16K 7/14 251/28 |
| 8,172,197 | B2 * | 5/2012 | Gu | F16K 7/17 137/625.27 |
| 9,109,719 | B2 * | 8/2015 | Dalton | F16K 31/385 |
| 9,285,041 | B2 * | 3/2016 | Mooney | F16K 7/14 |
| 9,341,281 | B2 * | 5/2016 | Hurst | G05D 7/03 |
| 9,803,755 | B2 * | 10/2017 | Weingarten | F16K 7/17 |
| 10,077,851 | B2 * | 9/2018 | Simonsen | F16K 31/385 |
| 10,088,849 | B2 * | 10/2018 | Hurst | G05D 7/0641 |
| 10,480,676 | B2 * | 11/2019 | Komatsuzaki | F16K 31/385 |
| 2002/0063227 | A1 * | 5/2002 | Matsuura | F16K 21/18 251/29 |
| 2015/0107704 | A1 | 4/2015 | Shishido | |

FOREIGN PATENT DOCUMENTS

| | | |
|---|---|---|
| JP | 2004-324659 | 11/2004 |
| JP | 2006-519971 | 8/2006 |
| JP | 2007-509291 | 4/2007 |
| JP | 6179510 | 8/2017 |

OTHER PUBLICATIONS

Office Action dated Nov. 16, 2021 in Chinese Patent Application No. 201910114493.4, with concise English translation.

* cited by examiner

VALVE DISPLACEMENT AND REGULATING MECHANISM

CROSS-REFERENCE TO RELATED APPLICATION

This application is based upon and claims the benefit of priority from Japanese Patent Application No. 2018-024294 filed on Feb. 14, 2018, the contents of which are incorporated herein by reference.

BACKGROUND OF THE INVENTION

Field of the Invention

The present invention relates to a valve and more specifically, to a valve capable of regulating the flow rate of pressurized fluid.

Description of the Related Art

As described in Japanese Patent No. 3095983, valves have been in wide use as those which, by being opened or closed, change pressurized fluid from a flow stop state to a flow state or from the flow state to the flow stop state. The flow rate of the pressurized fluid is controlled by a flow control device or the like also called a mass flow controller.

SUMMARY OF THE INVENTION

For example, in a discharge device, in order to prevent a discharge from being performed more than necessary, it is required to precisely control the flow rate of pressurized fluid. However, in the mass flow controller, it is not easy to perform such a precise control that minutely changes the flow rate particularly in an instantaneous discharge.

A main object of the present invention is to provide a valve capable of precisely regulating the flow rate of pressurized fluid.

According to one embodiment of the present invention, there is provided a valve including a body and a valve element, the body including an inlet port configured to be supplied with pressurized fluid, an outlet port configured to discharge the pressurized fluid, and a valve chamber provided between the inlet port and the outlet port, and the valve element disposed inside the valve chamber and configured to bring the inlet port and the outlet port into communication with each other or block communication therebetween, wherein:

the valve further includes a bonnet defining a pilot chamber together with the valve element;

the valve element includes a valve main body portion displaced in a direction to be seated on or to be separated from a valve seat provided inside the valve chamber and a diaphragm portion provided between the body and the bonnet; and the valve further includes a displacement amount regulating mechanism including an abutment member configured to be displaced in a direction to abut on or to separate from the valve main body portion, the abutment member configured to regulate a displacement amount of the valve element by abutting on the valve main body portion and stopping displacement of the valve main body portion.

That is, in the present invention, the abutment member is brought into abutment on the valve element for preventing the valve element from being further displaced. The opening degree when the displacement is stopped is determined as the maximum opening degree of the valve. Therefore, it is possible to make the maximum opening degree of the valve smaller than the design maximum opening degree which is obtained in a case where the abutment member does not abut on the valve element. Together with this effect, the flow rate of the pressurized fluid discharged from the valve becomes smaller than a design flow rate. Accordingly, in the case where this valve is used in, for example, a discharge device, it is possible to prevent the pressurized fluid from being discharged more than necessary.

Further, by varying the position of the abutment member, it is possible to vary the stop position of the valve element. That is, it is possible to arbitrarily vary the maximum opening degree of the valve. By exactly adjusting the position of the abutment member, it becomes possible to precisely regulate the maximum opening degree of the valve and hence the flow rate and the peak pressure of the pressurized fluid discharged from the valve.

The bonnet is configured as, for example, one having a step portion. In this case, the step portion may be provided with a pilot valve configured to control discharge of the pressurized fluid inside the pilot chamber to outside.

Further, the bonnet may include a cylindrical portion provided with the displacement amount regulating mechanism. In this configuration, if the step portion is formed at a part of the cylindrical portion, it becomes possible to downsize the valve.

It is preferable to provide the valve with a lock mechanism configured to fixedly position the abutment member. The reason is that the abutment member is fixedly positioned, that the maximum opening degree becomes constant, and that the flow rate of the pressurized fluid becomes stable. Further, the lock mechanism makes it impossible for the worker to easily adjust the opening degree. Therefore, it is possible to prevent the discharge or the like which exceeds a necessary amount set in advance by an administrator.

According to the present invention, the valve is configured to include the abutment member which is abutted on the valve element to prevent the same from being further displaced, in other words, which regulates the displacement amount of the valve element. Because the abutment member can make the maximum opening degree of the valve smaller than the design maximum opening degree, it is possible to make the flow rate of the pressurized fluid discharged from the valve smaller than the design flow rate.

Further, by varying the abutment position of the abutment member on the valve element, it is possible to vary the stop position of the valve element and hence to vary the maximum opening degree of the valve. Accordingly, by exactly adjusting the position of the abutment member, it is possible to precisely regulate the maximum opening degree of the valve and hence the flow rate and the peak pressure of the pressurized fluid discharged from the valve.

Consequently, in a discharge device which, for example, is configured to include this valve, it is possible to prevent the discharge from being performed more than necessary.

The above and other objects, features, and advantages of the present invention will become more apparent from the following description when taken in conjunction with the accompanying drawings, in which preferred embodiments of the present invention are shown by way of illustrative examples.

DESCRIPTION OF THE PREFERRED EMBODIMENTS

Hereinafter, with reference to the accompanying drawings, a valve according to the present invention will be described in detail based on preferred embodiments. Incidentally, the "left", "right", "up", and "down" in the following respectively correspond to the leftward, rightward, upward and downward directions in FIG. 1. However, these indications of directions are as a matter of convenience for easy understanding and do not specify the directions of the valve in use.

Figure 1:
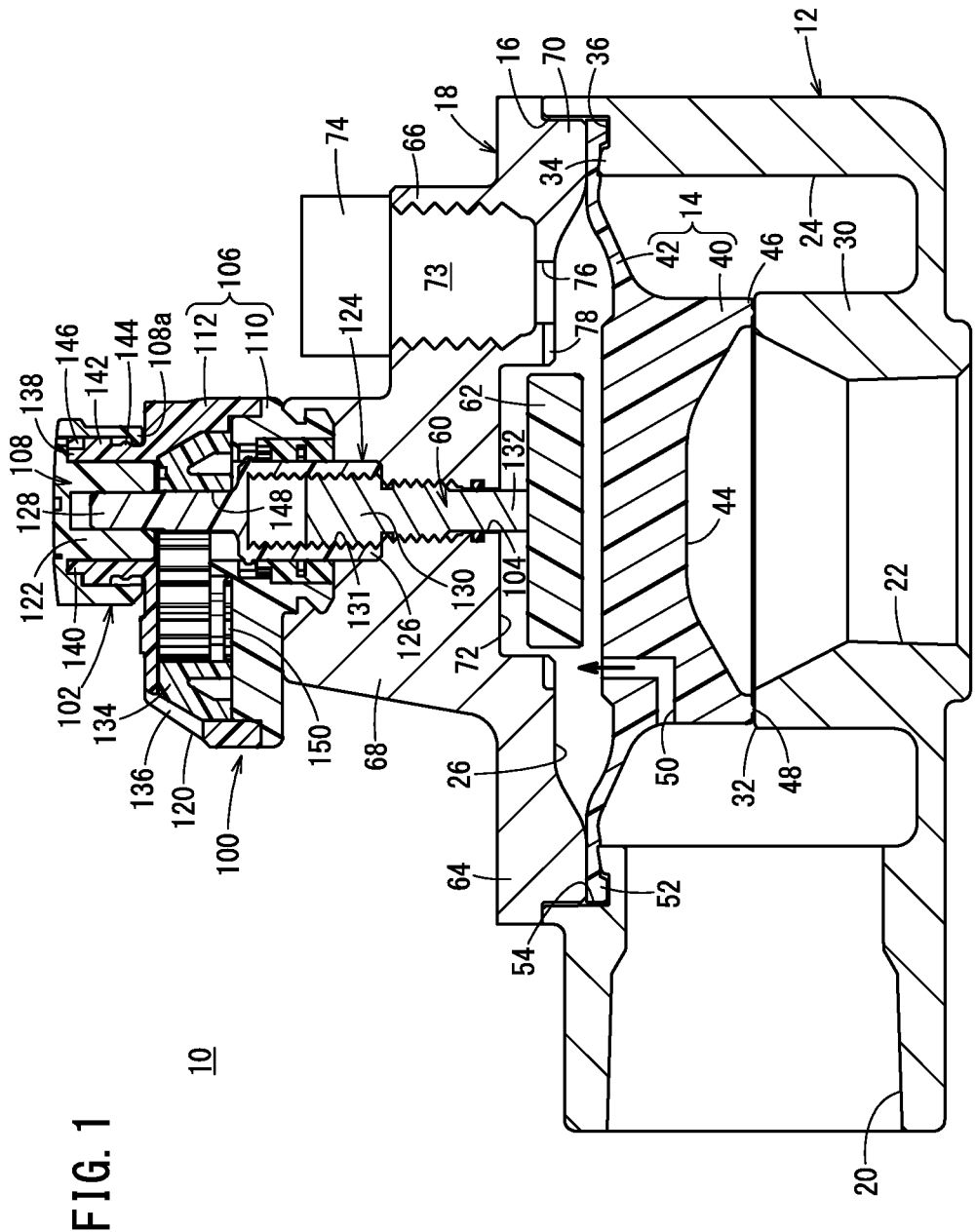
FIG. 1 is a longitudinal sectional view schematically showing the whole of a valve according to an embodiment of the present invention.

FIG. 1 is a longitudinal sectional view schematically showing the whole of a valve 10 according to the present embodiment. This valve 10 is equipped with a body 12, a valve element 14 accommodated inside the body 12, and a bonnet 18 closing an opening 16 formed at an upper portion of the body 12.

In the body 12, an inlet port 20 is formed at a left side portion, and an outlet port 22 is formed at a lower side portion. That is, the inlet port 20 and the outlet port 22 are substantially orthogonal to each other in positional relation. Further, the inside of the body 12 is divided by the valve element 14 into a valve chamber 24 and a pilot chamber 26.

Then, a cylindrical wall portion 30 defining the outlet port 22 protrudes inside the valve chamber 24 and functions, at its upper end, as a valve seat portion 32 which the valve element 14 is seated on or separated from. The valve seat portion 32 is formed at a position adjacent to the axial center of the inlet port 20.

An annular protrusion 34 annually protruding upward is formed at an inner peripheral end of the opening 16 which is formed at the upper portion of the body 12. The annular protrusion 34 is highest at an upper end on the inner peripheral side and slants downward gradually, toward the outer peripheral side. An annular groove 36 is formed between the annular protrusion 34 and an outer peripheral end of the opening 16.

In this case, the valve element 14 is constituted by a single member which integrally has a valve main body portion 40 and a diaphragm portion 42 extending radially outward from the valve main body portion 40. The diaphragm portion 42 is in the form of a flexible thin film. The valve element 14 of this kind is formed of, for example, an elastic resin material.

The valve main body portion 40 is disposed with its lower end facing the outlet port 22. At a center of the lower end of the valve main body portion 40, a recess portion 44 is formed and depressed toward the direction away from the outlet port 22, that is, depressed upward. Thus, an outer edge of the recess portion 44 annularly protrudes relative to the recess portion 44. The outer edge protruding annularly becomes a seated portion 46 that can be seated on the valve seat portion 32. The lower end surface of the seated portion 46 is provided with an annular protrusion 48 protruding toward the valve seat portion 32.

Further, a pilot passage 50 is formed in the valve main body portion 40, and opens in an outer peripheral surface and an upper end surface of the valve main body portion 40. After extending radially inward from the outer peripheral surface of the valve main body portion 40, the pilot passage 50 is bent almost at a right angle toward the upper end of the valve main body portion 40 and further penetrates to the upper end surface. That is, the pilot passage 50 is formed in an L-shape in section inside the valve main body portion 40 such that the valve chamber 24 on the outer peripheral side of the valve main body portion 40 communicates with the pilot chamber 26 on the upper side.

On the other hand, the inner peripheral portion of the diaphragm portion 42 is connected to the valve main body portion 40. Further, a hook portion 52 is formed on an outer edge of the diaphragm portion 42 to protrude therefrom, and the hook portion 52 is fitted in the annular groove 36.

Between an outer edge of the diaphragm portion 42, the body 12 and the bonnet 18, a gap 54 of a predetermined interval in the radial direction is provided radially outside the outer edge. When the outer edge of the diaphragm portion 42 is pressingly collapsed by being put between the body 12 and the bonnet 18, it becomes possible that a portion deformed by the collapse moves into the gap 54 on the outer peripheral side.

An abutment member 62 provided on a lower end of a displacement member 60 referred to later is brought into abutment on an upper end surface of the valve main body portion 40 facing the pilot chamber 26.

The bonnet 18 has, for example, a base portion 64 formed in a disk shape, a cylindrical portion 68 protruding upward from the base portion 64 and a step portion 66 provided at a part of the cylindrical portion 68, and the base portion 64 among these components closes the opening 16 of the body 12. By this closure, the pilot chamber 26 is defined between the valve element 14 and the base portion 64.

At an outer edge of a lower surface facing the valve element 14 of the base portion 64, a clamping portion 70 is formed to protrude downward and clamps an outer peripheral portion of the diaphragm portion 42 constituting the valve element 14. On the other hand, on an inner side of the clamping portion 70, a recess portion 72 is formed to avoid the interference with the abutment member 62. The recess portion 72 is depressed toward the upper side of the base portion 64.

The bonnet 18 covers the opening 16 of the body 12, with the hook portion 52 of the diaphragm portion 42 fitted in the annular groove 36 of the body 12. In this state, the outer edge of the diaphragm portion 42 including the hook portion 52 is clamped by the clamping portion 70 and the body 12. Further, fastening bolts (not shown) are pierced through a plurality of bolt insertion holes (not shown) which are provided along the outer periphery of the bonnet 18, and are screw-engaged with screw holes (not shown) of the body 12, so that the bonnet 18 is connected to the body 12.

As described above, the gap 54 of the predetermined interval is formed between the outer edge of the diaphragm portion 42 and an annular wall of the body 12. When the outer edge of the diaphragm portion 42 is sandwiched and pressingly collapsed by the body 12 and the clamping portion 70 which goes around at the lower end of the bonnet 18, a deformed portion moves into the gap 54. Thus, the diaphragm portion 42 is easily deformed.

The step portion 66 is provided with a hole portion (preferably, a screw hole) 73 therein directed toward the diaphragm portion 42, and a pilot valve 74 is provided to close the hole portion 73. It is preferable that a lower end of an assembly of the pilot valve 74 be hollow and screw-shaped because the assembly is screwed and secured to the hole portion 73. The pilot valve 74 is constituted by a two-way valve having a solenoid portion which is excited by being energized, and is brought into an open state when the solenoid portion is excited, so that a pilot port 76 provided at the step portion 66 is brought into communication with the outside. Further, an annular path 78 communicating with the pilot port 76 is formed around the opening of the recess portion 72 of the base portion 64.

The cylindrical portion 68 is provided with a flow rate control device 100 as displacement amount regulating means. The flow rate control device 100 basically has the same configuration as that described in Japanese Patent No. 6179510, and thus, the outline of the device 100 will be described hereunder.

The flow rate control device 100 primarily has a flow rate adjustment and indication unit 102 and the displacement member 60. The displacement member 60 is inserted into an insertion hole 104 which is formed to penetrate in the axial direction of the cylindrical portion 68. A lower distal end of the displacement member 60 protrudes inside the pilot chamber 26 to face the abutment member 62.

The flow rate adjustment and indication unit 102 serves as an operating mechanism for both of adjusting the protruding amount of the displacement member 60 in the pilot chamber 26 and thereby regulating the displacement of the valve element 14. The flow rate adjustment and indication unit 102 has a casing 106 accommodating the operating mechanism and a knob 108 rotatably attached at an upper portion of the casing 106. The casing 106 is configured to be detachable relative to the bonnet 18.

Figure 2:
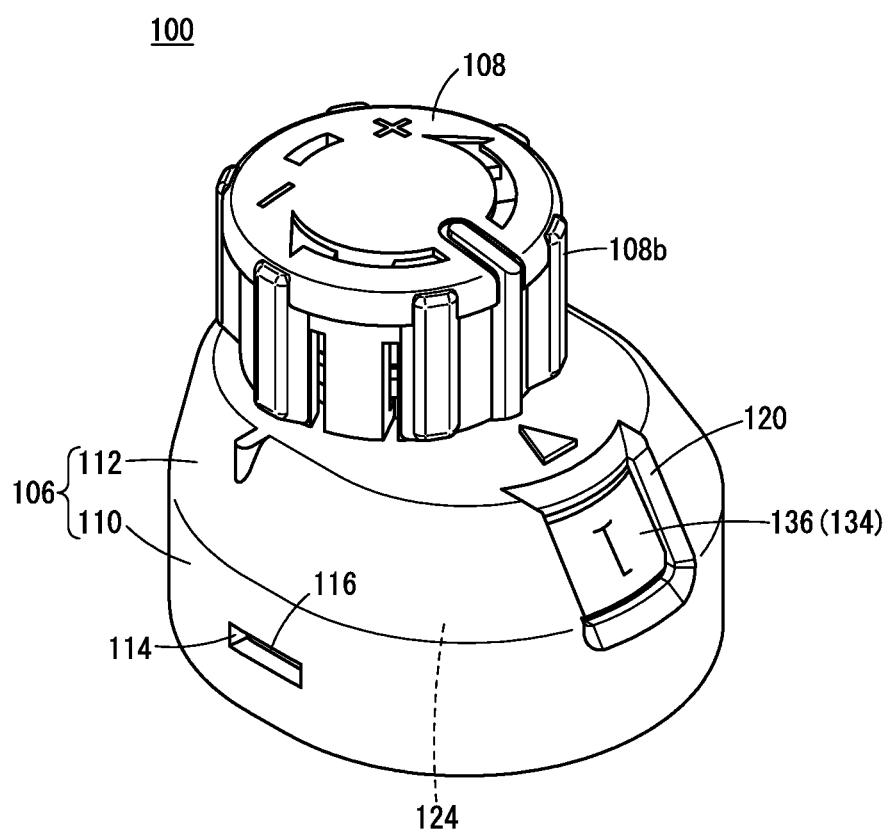
FIG. 2 is a schematic perspective view showing a flow rate control device of the valve in FIG. 1.

The casing 106 has a lower casing 110 and an upper casing 112 which are dividable. The upper casing 112 is formed in a dome shape such that an interior space in a state mounted on the lower casing 110 has a predetermined volume. An end of the upper casing 112 facing the lower casing 110 is an opening having a relatively large inside diameter, and an upper end of the lower casing 110 is inserted into the opening. Further, on a side surface of the lower casing 110, a plurality of (for example, four) engaging slots 114 are formed at regular intervals (refer to FIG. 2). Mounting hooks 116 which are formed to protrude from a side surface of the upper casing 112 are respectively inserted into the engaging slots 114. The lower casing 110 and the upper casing 112 are connected through the insertions of the mounting hooks 116 into the engaging slots 114.

An indication window 120 is formed on the side surface of the upper casing 112. The knob 108 operates as an operating portion for adjusting the flow rate of fluid inside the valve 10 when rotationally operated relative to the casing 106 by the user. The indication window 120 numerically indicates the flow rate variation of fluid (that is, a rotational amount of the knob 108).

As shown in FIG. 1, the knob 108 is formed in a bottomed cylindrical shape having a bottom portion on an upper surface side, and a cylindrical fitting portion 122 extending downward is formed at a center of an upper bottom portion of the cylindrical portion. A rotation transmission member 124 is fitted in the fitting portion 122. An inner peripheral surface (female shape) of the fitting portion 122 and an outer peripheral surface (male shape) of the rotation transmission member 124 are configured so that the knob 108 can be displaced vertically and be fitted at a position displaced upward. In the fitted state, the rotational force of the knob 108 is smoothly transmitted to the rotation transmission member 124.

The rotation transmission member 124 is a member for operating the displacement of the displacement member 60 and the abutment member 62, and is formed to have a predetermined length in the vertical direction. The rotation transmission member 124 has a cylindrical portion 126 being a hollow cylindrical shape and a pillar portion 128 extending upward from an upper surface of the cylindrical portion 126.

The hollow interior of the cylindrical portion 126 is formed as a space portion 131 in which a shaft portion 130 of the displacement member 60 can advance and retract in the axial direction. A female screw portion is formed on an inner peripheral wall of the space portion 131 and is in screw-engagement with a male screw portion formed on a side peripheral wall of the shaft portion 130 of the displacement member 60.

The pillar portion 128 is formed in a cylindrical shape which is smaller in outside diameter than the cylindrical portion 126, extends upward through the casing 106 and is connected to the knob 108 at its upper end.

The displacement member 60 is a solid round rod member extending in the vertical direction. The displacement member 60 has a connecting lower end 132 and the shaft portion 130. The abutment member 62 is provided on an end surface of the connecting lower end 132, and is capable of abutting on the upper surface of the valve main body portion 40.

The shaft portion 130 is formed to have a predetermined length in the axial direction, and has the male screw portion formed on the side peripheral wall as described above. The male screw portion is screw-engaged with the female screw portion on an inner surface of the rotation transmission member 124 (displacement operating portion) extending toward the shaft portion 130. Thus, when the rotation transmission member 124 is rotated, it is possible to advance and retract (displace) the displacement member 60 including the shaft portion 130 in the vertical direction.

The flow rate adjustment and indication unit 102 is equipped with an indication ring 134 provided inside the casing 106 in addition to the aforementioned casing 106, knob 108 and rotation transmission member 124.

The indication ring 134 is rotatably received inside the upper casing 112 in the dome shape. The aforementioned indication window 120 is formed on the side surface of the upper casing 112, and a scale 136 on the indication ring 134 is visible through the indication window 120.

The upper casing 112 has a cylindrical upper protrusion 138 having a predetermined inside diameter. The upper protrusion 138 is inserted inside the knob 108 and rotatably supports the knob 108. An upper end of an outer peripheral surface of the upper protrusion 138 is provided with a knob rotation restricting portion 140, and a first annular protrusion 142 and a second annular protrusion 144 are formed on a lower portion of the knob rotation restricting portion 140. Thus, an inside protrusion 108a at the lower end of the knob 108 is engageable with the first and second annular protrusions 142, 144 in a stepwise manner.

A wall portion of the knob 108 surrounding the fitting portion 122 has a plurality of ridges 108b on its outer peripheral surface, to be easily gripped by the user. Further, at an upper portion of the inner peripheral surface of the wall portion, an abutment portion 146 is provided, and is brought into abutment on the knob rotation restricting portion 140. At a lower portion of the inner peripheral surface, the inside protrusion 108a is provided and protrudes radially inward.

The knob 108 is switchable to a rotatable state and a rotation prevention state in dependence on its vertical position relative to the upper protrusion 138. That is, in the state that the knob 108 is at a lower position with the inside protrusion 108a engaging with the second annular protrusion 144 of the upper protrusion 138, the abutment portion 146 of the knob 108 becomes to abut on the knob rotation restricting portion 140, so that the rotation of the knob 108 is restricted. In the case where the knob 108 is to be rotationally operated, the knob 108 is pulled upward to climb over the second annular protrusion 144 to release the abutment between the abutment portion 146 and the knob rotation restricting portion 140. Thus, the knob 108 becomes rotatable relative to the upper casing 112.

The indication ring 134 is formed in an annular shape having a hole portion 148 enabling the rotation transmission member 124 to penetrate therethrough. The indication ring 134 is disposed with its rotational center being eccentric relative to the insertion position of the rotation transmission member 124, by a spacer 150. Further, the indication ring 134 has a taper surface slanting on an upper side of the outer peripheral surface thereof, and the scale 136 indicating the flow rate variation of fluid is printed on the taper surface. The scale 136 faces the indication window 120. Thus, the scale 136 can be visually recognized by the user distinctively.

In the arrangement of the indication ring 134, the rotation transmission member 124 is inserted into the hole portion 148. Inscribed teeth (not shown) are formed on the indication ring 134, while a meshing portion (not shown) is formed on an outer peripheral surface of the rotation transmission member 124. The indication ring 134 can be rotationally operated only when the meshing portion is engaged (meshed) with the inscribed teeth.

The valve 10 according to the present embodiment is basically configured as described hereinabove. Next, the operation and advantageous effects of the valve 10 will be described hereunder.

In the case where the flow rate control is necessary to the pressurized fluid flowing through the valve 10, the user grips the knob 108 and pulls the same upward. As a result, the inside protrusion 108a at the lower end of the knob 108 is engaged with the first annular protrusion 142, and the meshing portion comes into an engaged (meshed) state with the inscribed teeth. Subsequently, when the user rotates the knob 108, the rotation transmission member 124 and the indication ring 134 are rotated. Following the rotation of the rotation transmission member 124, the displacement member 60 is rotated and moved downward or upward inside the space portion 131 of the cylindrical portion 126. Following the movement, the abutment member 62 moves downward or upward inside the pilot chamber 26.

The position of the abutment member 62 is graspable from the scale 136 on the indication ring 134. That is, when the flow rate of the pressurized fluid in the valve 10 is desired to be increased corresponding to the numeral indicated by the scale 136, a setting may be made so that the displacement member 60 and the abutment member 62 go up as the numeral of the scale 136 becomes large.

When the scale 136 indicates a predetermined or target value, the user stop rotating the knob 108. Further, the user presses down the knob 108 to engage the inside protrusion 108a at the lower end of the knob 108 with the second annular protrusion 144, and the engagement between the meshing portion and the inscribed teeth is released. As a result, the knob 108 is locked to become unable to be rotated, and thus, the displacement member 60 and the abutment member 62 become unable to be displaced.

When pilot pressure fluid, in other words, a pilot pressure is not supplied from the pilot valve 74, the valve main body portion 40 of the valve element 14 is seated on the valve seat portion 32. Therefore, the valve chamber 24 and the outlet port 22 are in a communication cutoff state, wherein the valve 10 is in a closed state.

In order to bring the valve 10 into an open state, the pressurized fluid from a pressurized fluid supply source is introduced into the valve chamber 24 through the inlet port 20. The pressurized fluid flows through the pilot passage 50 opening to the valve chamber 24 and flows into the pilot chamber 26 on the bonnet 18 side. The valve element 14 receives the pressure of the pressurized fluid within the pilot chamber 26 and is pressed on the valve seat portion 32 side.

Thereafter, when the pilot valve 74 is energized, the pilot valve 74 being a two-way valve is opened, whereby the pilot port 76 is opened. Accordingly, the pressurized fluid within the pilot chamber 26 is gradually discharged to the outside through the pilot port 76. When the pressure in the pilot chamber 26 goes down due to the discharge, the pressing force on the valve element 14 decreases. As a consequence, the pressure of the pressurized fluid in the valve chamber 24 becomes higher than that in the pilot chamber 26, so that the valve main body portion 40 is displaced in a direction away from the valve seat portion 32. That is, the seated portion 46 goes away from the valve seat portion 32. Thus, the valve 10 becomes an open state, and the pressurized fluid having flown from the inlet port 20 to the valve chamber 24 is discharged from the outlet port 22.

Figure 3:
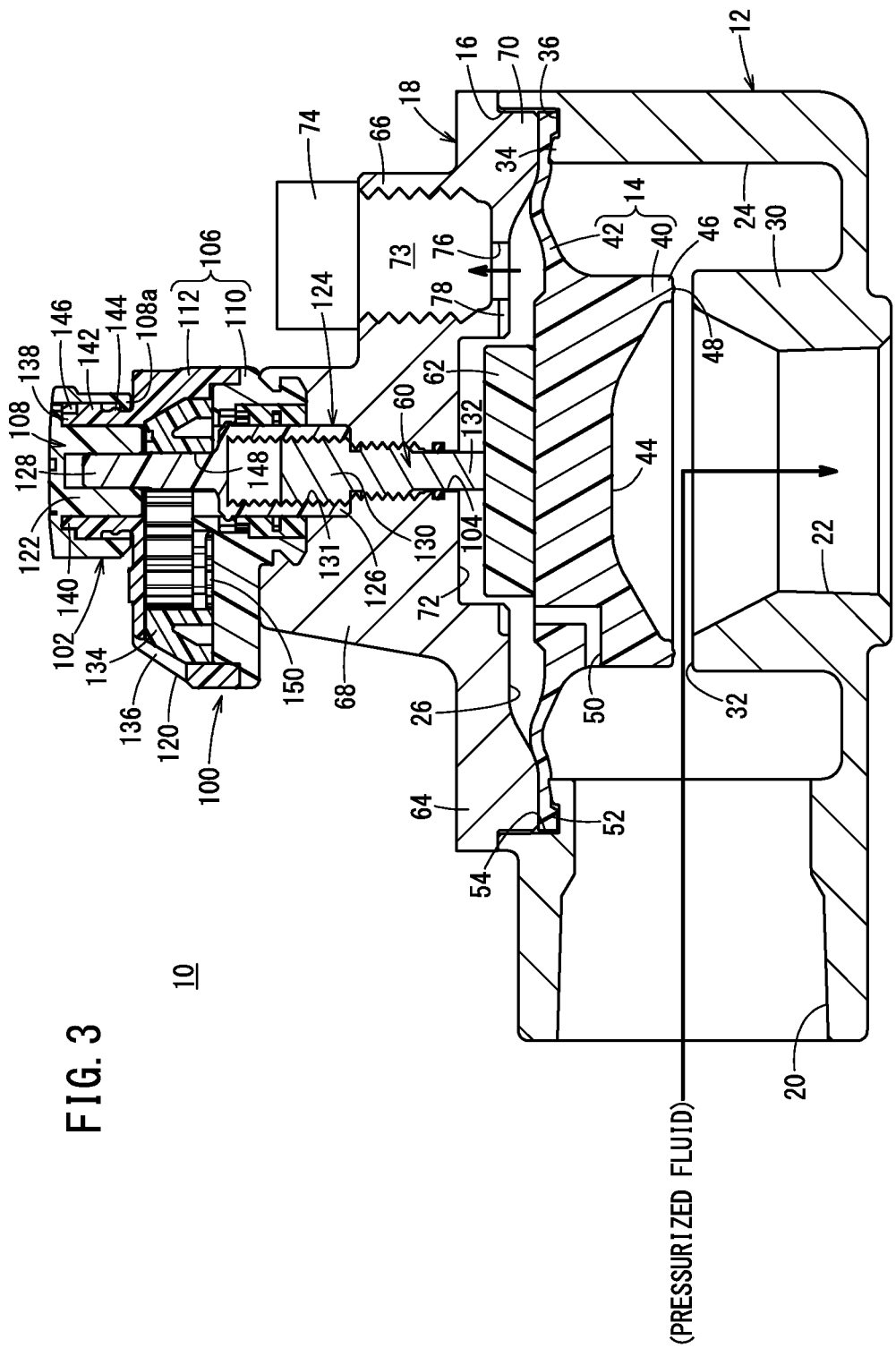
FIG. 3 is a longitudinal sectional view schematically showing the whole of the valve in FIG. 1 in a valve open state.

The rising valve main body portion 40 is stopped by the abutment of the upper end surface on the abutment member 62, as shown in FIG. 3. That is, the valve element 14 is prevented from further rising, by the abutment member 62. Therefore, the separation distance between the seated portion 46 and the valve seat portion 32, in other words, the opening degree of the valve 10 is determined. The pressurized fluid is discharged from the outlet port 22 at a flow rate meeting the opening degree.

The positions of the displacement member 60 and the abutment member 62 are varied by rotating the knob 108. As the protruding mount of the abutment member 62 into the pilot chamber 26 increases, the rising amount of the valve element 14 decreases and the opening degree of the valve 10 becomes small. Accordingly, the flow rate of the pressurized fluid becomes less. On the contrary, as the protruding mount of the abutment member 62 decreases, the rising mount of the valve element 14 and the opening degree of the valve 10 become large, and the flow rate of the pressurized fluid increases.

As understood from this, depending on the abutment position of the abutment member 62 on the valve main body portion 40, the opening degree of the valve 10 is determined and the flow rate of the pressurized fluid is determined. That is, the maximum flow rate and the peak pressure of the pressurized fluid are regulated by the flow rate control device 100.

The protruding amount of the abutment member 62 can be varied precisely by rotating the knob 108. Accordingly, it is possible to minutely vary the maximum flow rate of the pressurized fluid discharged from the outlet port 22. That is, it is possible to precisely regulate the flow rate of the pressurized fluid. Therefore, in the case where the valve 10 is used in, for example, a discharge device, it is possible to prevent the discharge from being performed more than necessary.

In order to bring the valve 10 into the closed state by seating the seated portion 46 on the valve seat portion 32 after a predetermined flow of the pressurized fluid is completed, the energization of the pilot valve 74 is discontinued in the first place. Thus, the pilot valve 74 is closed, which results in the stop of discharging the pressurized fluid from the pilot chamber 26 through the pilot port 76. Therefore, the inside of the pilot chamber 26 becomes a closed state, and the pressurized fluid flowing from the valve chamber 24 through the pilot passage 50 is accumulated in the pilot chamber 26. As a result, the pressure inside the pilot chamber 26 is increased gradually.

When the pressure inside the pilot chamber 26 exceeds the pressure inside the valve chamber 24, the pressurized fluid in the pilot chamber 26 presses the valve element 14 on the valve seat portion 32 side. Consequently, the seated portion 46 is seated on the valve seat portion 32 to cut off the communication between the valve chamber 24 and the outlet port 22, whereby the valve 10 becomes the closed state to stop the flow of the pressurized fluid.

The present invention is not particularly limited to the foregoing embodiment and may be variously altered without departing from the gist of the present invention.

Figure 4:
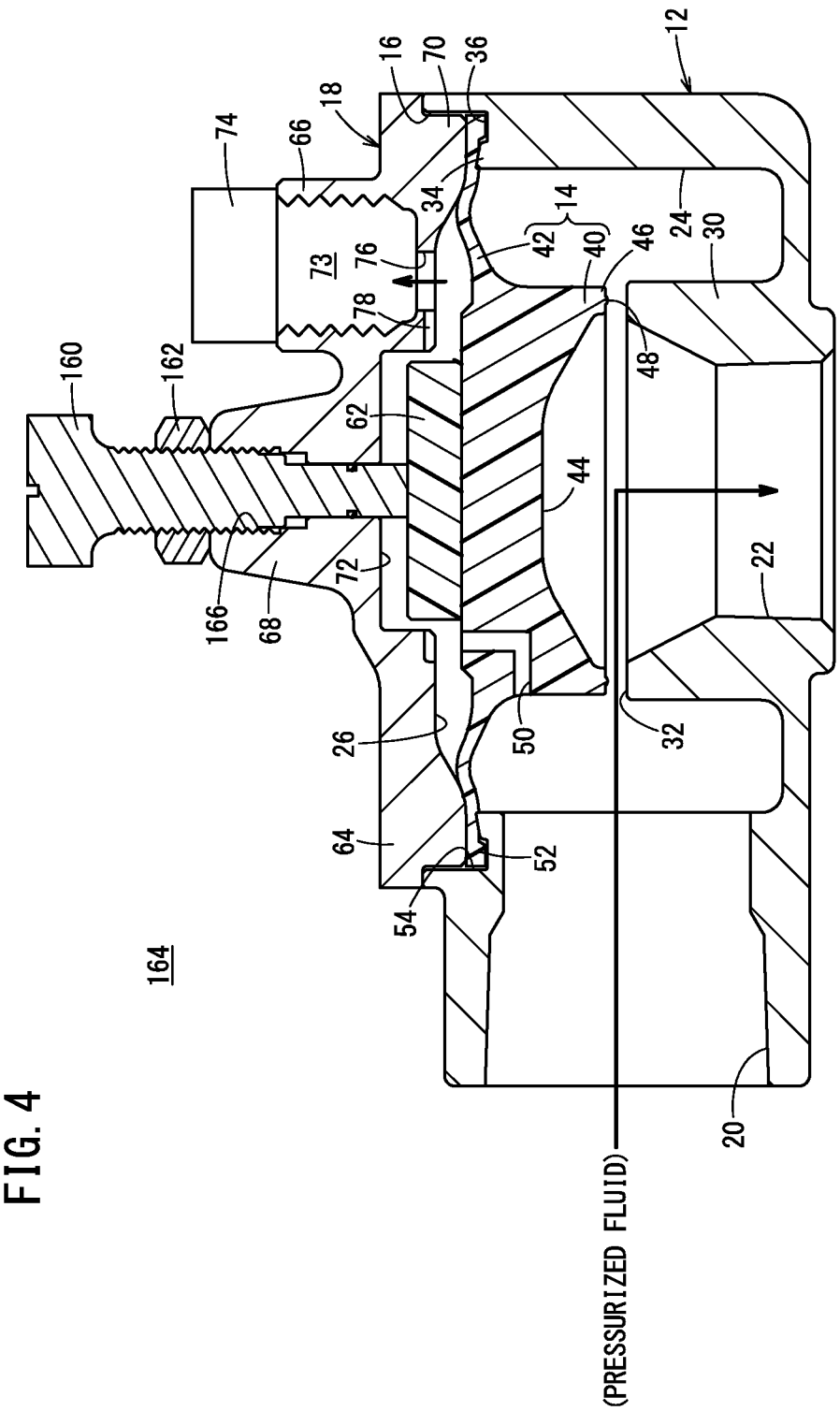
FIG. 4 is a longitudinal sectional view schematically showing the whole of a valve according to another embodiment of the present invention.

For example, as shown in FIG. 4, the abutment member may be configured by a relatively long screw 160, and a nut 162 is screw-engaged with a male screw portion of the screw 160 to configure a flow rate control unit. In this valve 164, a screw hole 166 is formed in the cylindrical portion 68, and the male screw portion of the screw 160 is inserted and screwed into the screw hole 166. The nut 162 is fastened when the screw 160 reaches a predetermined depth of the screw hole 166. By this fastening, the screw 160 is fixedly positioned. That is, in this case, the nut 162 operates as locking means for preventing the screw 160 from being displaced.

Needless to say, the displacement amount of the valve element 14 and hence the opening degree of the valve 164 are determined depending on the dimension by which the screw 160 protrudes into the pilot chamber 26.

Further, the valve main body portion and the diaphragm portion may be configured as separate members, and both of them may be combined.

What is claimed is:

1. A valve comprising:
    a body including an inlet port configured to be supplied with pressurized fluid, an outlet port configured to discharge the pressurized fluid, and a valve chamber provided between the inlet port and the outlet port;
    a bonnet provided to the body;
    a valve element provided between the body and the bonnet to separate the valve chamber and a pilot chamber, the valve element being displaceable in a displacement direction by a balance of fluid pressures in the valve chamber and the pilot chamber to bring the inlet port and the outlet port into communication with each other or to block communication therebetween, wherein the valve element includes a valve main body portion able to be displaced in the displacement direction, to be seated on or to be separated from a valve seat provided inside the valve chamber, and a diaphragm portion secured between the body and the bonnet;
    a displacement member being displaceable in the displacement direction, the displacement member being provided to remain stationary at a fixed position relative to the bonnet when the valve element is displaced in the displacement direction, the fixed position being independent of the fluid pressure in the pilot chamber;
    an abutment member fixed to the displacement member and disposed in the pilot chamber, the abutment member separating from the valve element when the valve element is displaced in a forward direction to be seated on the valve seat to block the communication between the inlet port and the outlet port, the abutment member abutting on the valve element when the valve element is displaced in a backward direction to separate from the valve seat to bring the inlet port and the outlet port into communication with each other, to limit the displacement of the valve element, wherein when the displacement member is displaced, the abutment member is displaced integrally with the displacement member between a closed position and an open position of the valve element, and the position of the abutment member relative to the bonnet in the displacement direction is fixed by the fixed position of the displacement member;
    a displacement amount regulating mechanism provided externally of the bonnet, the displacement amount regulating mechanism being rotatable to displace the displacement member forward or backward in the displacement direction for adjusting the fixed position of the displacement member relative to the bonnet in the displacement direction; and
    a locking mechanism fixedly positioning the abutment member in both of the forward and backward directions by locking the rotation of the displacement amount regulating mechanism.

2. The valve according to claim 1, wherein the bonnet includes a step portion, and the step portion is provided with a pilot valve configured to control discharge of the pressurized fluid inside the pilot chamber to outside.

3. The valve according to claim 2, wherein the bonnet includes a cylindrical portion provided with the displacement amount regulating mechanism, and the step portion is formed at a part of the cylindrical portion.

4. The valve according to claim 1, wherein the displacement member is a rod extending in the displacement direction and having threads mating with threads on the bonnet, wherein the abutment member is secured to an end of the rod in the pilot chamber, and wherein the displacement amount regulating mechanism is configured to rotate the rod.

5. The valve according to claim 1, wherein an entirety of the displacement member has said fixed position independent of the fluid pressure in the pilot chamber.

* * * * *